US007200560B2

(12) United States Patent
Philbert

(10) Patent No.: US 7,200,560 B2
(45) Date of Patent: Apr. 3, 2007

(54) PORTABLE READING DEVICE WITH DISPLAY CAPABILITY

(76) Inventor: Medaline Elizabeth Philbert, 173 Webster Ave., Yonkers, NY (US) 10701

( * ) Notice: Subject to any disclaimer, the term of this patent is extended or adjusted under 35 U.S.C. 154(b) by 760 days.

(21) Appl. No.: 10/299,893

(22) Filed: Nov. 19, 2002

(65) Prior Publication Data

US 2004/0098262 A1 May 20, 2004

(51) Int. Cl.
*G06K 9/22* (2006.01)

(52) U.S. Cl. ...................... 704/271; 704/260; 382/189; 382/313

(58) Field of Classification Search ................ 704/260, 704/271; 382/189, 313
See application file for complete search history.

(56) References Cited

U.S. PATENT DOCUMENTS 5,034,598 A * 7/1991 Poland ....................... 235/435
5,233,333 A * 8/1993 Borsuk ....................... 345/660
5,327,503 A * 7/1994 Kiyohara .................... 382/321
5,670,992 A * 9/1997 Yasuhara et al. ........... 345/173
5,767,841 A * 6/1998 Hartman ..................... 345/167
5,850,629 A * 12/1998 Holm et al. ................ 704/260
5,999,903 A * 12/1999 Dionne et al. .............. 704/271
6,033,224 A * 3/2000 Kurzweil et al. ........... 434/112
6,061,666 A * 5/2000 Do et al. ....................... 705/43
6,067,358 A * 5/2000 Grant .................... 379/433.07
6,115,482 A * 9/2000 Sears et al. ................. 382/114
6,169,789 B1 * 1/2001 Rao et al. .............. 379/110.01
6,377,925 B1 * 4/2002 Greene et al. .............. 704/271
6,417,844 B1 * 7/2002 Kodama ...................... 345/173
6,459,364 B2 * 10/2002 Gupta ..................... 340/407.1
6,529,645 B2 * 3/2003 Fahraeus et al. ............ 382/313
6,535,873 B1 * 3/2003 Fagan et al. .................... 707/3
6,542,623 B1 * 4/2003 Kahn ......................... 382/114
6,564,186 B1 * 5/2003 Kiraly et al. ............... 704/260
6,823,084 B2 * 11/2004 Myers et al. ............... 382/187
6,943,670 B2 * 9/2005 Liguori et al. .............. 340/321
6,963,386 B2 * 11/2005 Poliakine et al. ........... 349/152
6,995,875 B2 * 2/2006 Dow et al. .................. 358/473
6,996,564 B2 * 2/2006 Lester et al. .................. 707/10
2002/0071047 A1 * 6/2002 Strong et al. .......... 348/333.02

OTHER PUBLICATIONS http://www.aroga.com/news.asp?ID=11, "Kurzweil 1000 version 6.0 Released", Oct. 1, 2001.*
Chieko Asakawa, Hironobu Takagi, Takashi Itoh, "Document Reader for the Blind", http://www.csun.edu/cod/conf/2000/proceedings/csun00.htm, Center On Disabilities, Technology And Persons With Disabilities Conference 2000.*
AFB Access World, http://www.afb.org/afbpress/pub.asp?DocID=aw0205news, "News", Sep. 2001, vol. 2, No. 5.*

(Continued)

*Primary Examiner*—David Hudspeth
*Assistant Examiner*—E. Yen

(57) ABSTRACT

A hand held device that captures information with the capability to read only the captured information, display only the captured information, or simultaneously read and display the captured information. The device includes text-to-voice technology, a flat-panel display, a computer processor, a headphone for private receipt of transmitted information, microphone to receive dictated information, and storage. The device enables blind and/or visual impaired persons to read information anytime and anywhere.

1 Claim, 3 Drawing Sheets

OTHER PUBLICATIONS

Ali Zandifar, Ramani Duraiswami, Antoine Chahine, Larry S. Davis, “A Video Based Interface To Textual Information for the Visually Impaired”, IEEE 2002.*

Jie Yang, Weiyi Yang, Matthias Denecke, Alex Waibel, “Smart Sight: A Tourist Assistant System”, IEEE, 1999.*

Jie Yang, Jiang Gao, Ying Zhang, Xilin Chen, Alex Waibel, “An Automatic Sign Recognition and Translation System”, ACM, 2001.*

Victor Wu, Raghavan Manmatha, Edward M. Riseman, “TextFinder: An Automatic System to Detect and Recognize Text in Images”, IEEE 1999.*

* cited by examiner

PORTABLE READING DEVICE WITH DISPLAY CAPABILITY

CROSS REFERENCE TO RELATED APPLICATIONS

| | | | |
|---|---|---|---|
| 5550938 | August 1996 | Hayakawa et al. | 382/313 |
| 6218964 | April 2001 | Ellis | 340/990 |
| 6248996 | June 2001 | Johnson | 250/234 |
| 6396518 | May 2002 | Dow et al. | 345/772 |
| 6421235 | July 2002 | Ditzik | 361/683 |

STATEMENT REGARDING FEDERALLY SPONSORED RESEARCH OR DEVELOPMENT

Not Applicable

REFERENCE TO SEQUENCE LISTING A TABLE OR A COMPUTER PROGRAM LISTING COMPACT DISK APPENDIX

Not Applicable

BACKGROUND OF THE INVENTION

The present invention relates generally to a portable hand-held reading device that captures print information through digital scanning, and reproduces the information via text-to-voice technology and on a flat-panel display. All these processes are performed within the device without the intervention of additional external devices.

The freedom to read anywhere, anytime, and regular information to include newspapers, is of vital importance that can be exploited by blind and visual impaired persons in many circumstances.

Currently, blind and visual impaired persons are confined to the use of desktop PC to access information. The ease of access to information is dependent on certain standards that programmers adhere to that enable assistive technology, such as screen readers, to read and/or convert electronic information. The use of flatbed scanners, CCTV, and Kurzweil are required to read print materials. These devices are usually in a special or specific location of a work environment or academic institution.

The digital scanner plays a vital role in the conversion between paper and electronic information. However, while scanners are ideal for users to communicate print information with colleagues through various electronic mediums, they lack portability and hence, blind and visual impaired users are confined to the location of the scanners. In effect, they lack the convenience and flexibility to blind and visual impaired persons to access information anytime, anywhere. Hand-held scanners are an improvement, U.S. Pat. No. 6,396,518 to Dow et al., but are dependent on external units, such as a computer, printer, or facsimile machine to communicate scanned images. U.S. Pat. No. 6,218,963 to Ellis discloses a digital reading pen that is designed to be dependent on a monitor or printer so that scanned information can be magnified for reading or printing.

Moreover, what is sought is a portable, hand-held reading device that allows users to read in real time captured print information without the intervention of external devices.

In addition, the portable hand-held reading device provides cordless operation with the exception of a headphone unit that may be connected into device to listen to the scanned information.

SUMMARY OF THE INVENTION

An object of the present invention, a portable hand-held reading device, is to provide the user, in particular, a blind or visually impaired person the ability to read print information anywhere, anytime.

Another advantage of the present invention includes both text-to-voice technology and flat-panel display, giving the user the option to listen to text read only, listen to text read and simultaneously read text on flat-panel display, or to read text only on the flat-panel display.

Another advantage of the present invention is that all functions are done internally without the invention of external devices to convert text to voice and/or to display information on the flat-panel unit.

Still another advantage of this invention is a microphone for receiving dictated information giving the user the option to listen to a familiar voice such as that of the user, or of a member of the user's family or friends, rather than listen to the voice programmed in the device.

A further advantage of the invention is that the device automatically pauses when the device is not in contact with paper, and appends information when contact resumes while the image capture buttons are depressed.

Yet another advantage of the invention is the ability of the device to automatically delete information when scanning resumes for new information after the conversion to text-to-voice technology and/or text display on the flat-panel display, thus efficiently utilizing storage.

Still another advantage of the invention is the ability to save selected information before resuming to capture new information.

A further advantage of the invention is the display of text one sentence at a time, in Marquee style, giving the user the ability to magnify the font to desirable size, without having to display an entire page on the panel.

Another advantage of the invention is the navigation buttons. The left button allows the user to read the previous sentence, the right button the next sentence, the up button the previous paragraph, and the down button the next paragraph. The up and down buttons give the user the option to scan information rather than read sentence by sentence.

Still another advantage of the invention is the ease of use by both left and right-handed users afforded by image capture buttons on either side of the device.

BRIEF DESCRIPTION OF THE SERVERAL VIEWS OF THE DRAWING

DETAILED DESCRIPTION OF THE INVENTION

Figure 1A:
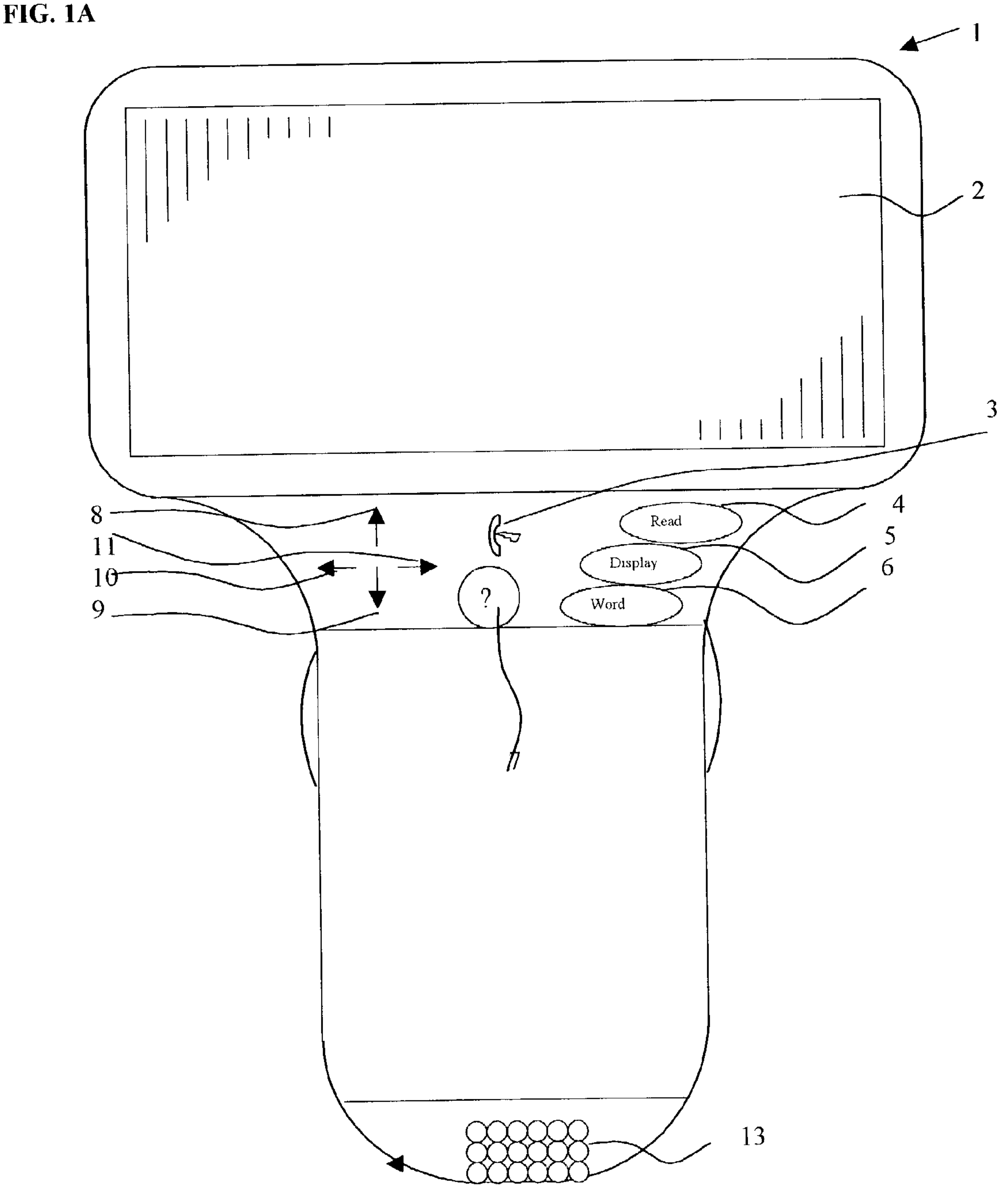
FIG. 1A is an elevation view of the portable hand-held reading device according to the invention, which depicts a side of the unit containing the display screen, operation buttons, navigation buttons, power switch, microphone, headset outlet, and partial view of the capture buttons.

As shown in FIG. 1A, a portable hand-held reading device depicts one side (i.e. front) of appliance 1 where a flat-panel display 2 along with user operation buttons 3, 4, 5, 6, 7, user navigation buttons 8, 9, 10, 11, and microphone 13 are located. Display 2 is preferably of the flat-panel assortment to accommodate larger fonts and marquee style display of scanned information of device 1. Display 2 is one of the means by which scanned print information is communicated to the user. As used herein, the term information means print text. The power switch 3 turns the device on and off. The user operation buttons comprise Braille and text imposed Read button 4, Braille and text imposed Display button 5, and Braille and text imposed Word button 6. The buttons will be large enough to accommodate the shortest and communicable Braille word (for example, word is substituted for dictionary because it is shorter). Help button 7 provides the user with access to how-to instructions on the operation of device 1. The navigation buttons include an up button 8, a down button 9, a left button 10, and a right button 11 and are controlled by the user. To view previous read and/or displayed information a sentence at a time, the users presses button 10; to view the next or following sentences, the users presses button 11; to view previous information a paragraph at a time the user presses button 8, and to view or skim information paragraphs at a time the user presses button 9. Microphone 13 for receiving audible information either from the user or the family of the user so that information read back to the user is in a familiar voice.

Figure 1B:
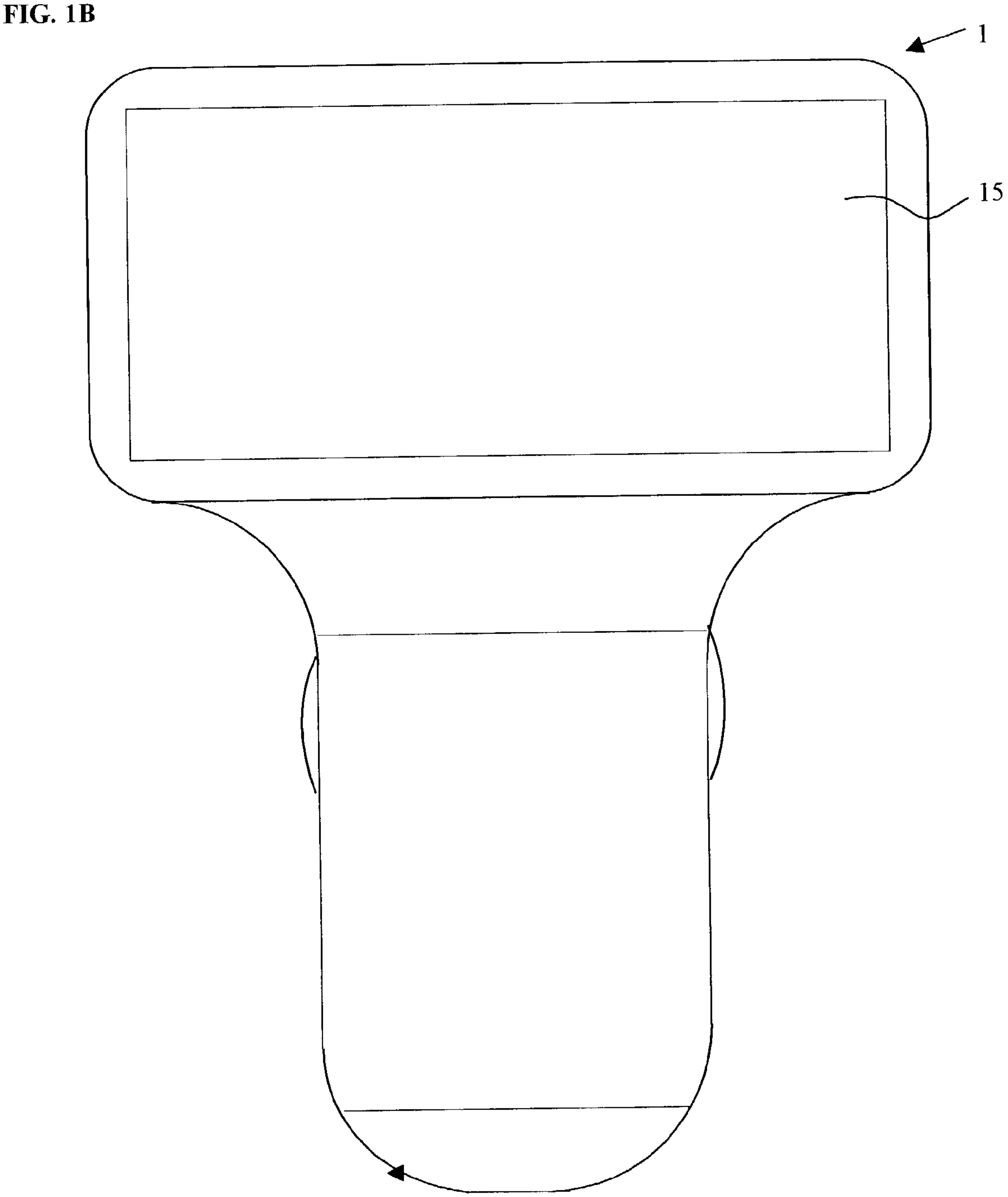
FIG. 1B is an elevation view of the device of FIG. 1A depicting the opposing side to that illustrated in FIG. 1A, which contains photoelement array, and partial views of capture buttons and headphone outlet.

FIG. 1B shows the side of device 1 opposite that illustrated in FIG. 1A (i.e. back). The opposite side of device 1 includes photoelement array 15 through which information is captured into memory.

Figure 1C:
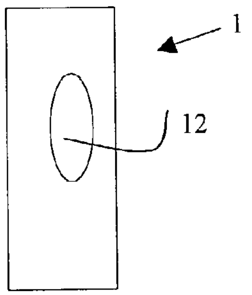
FIG. 1C is an elevation view of the device of FIGS. 1A and 1B depicting an end of the unit, which contains a capture button accommodating a left-handed user.
Figure 1D:
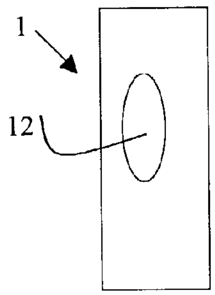
FIG. 1D is an elevation view of the device of FIGS. 1A, 1B, and 1C depicting the opposing end of that illustrated in FIG. 1C, which contains a capture button accommodating a right-handed user.
Figure 1E:
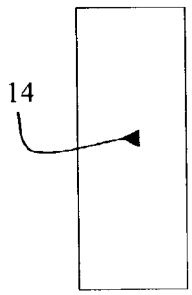
FIG. 1E is an elevation view of the device of FIGS. 1A, 1B, 1C, 1D depicting the bottom end of the unit, which contains a headphone outlet.

A capture button 12 included at one side of device 1 as depicted in FIG. 1C, and a capture button 12 located at the other side of device 1 as depicted in FIG. 1D are both accommodating to right-handed and left-handed users to satisfy the ergonomic requirements of users. A headphone outlet 14 as depicted in FIG. 1E is located at the bottom end of device 1 minimizing the interference of the headphone line/cord with the physical process of the user scanning information.

Figure 2:
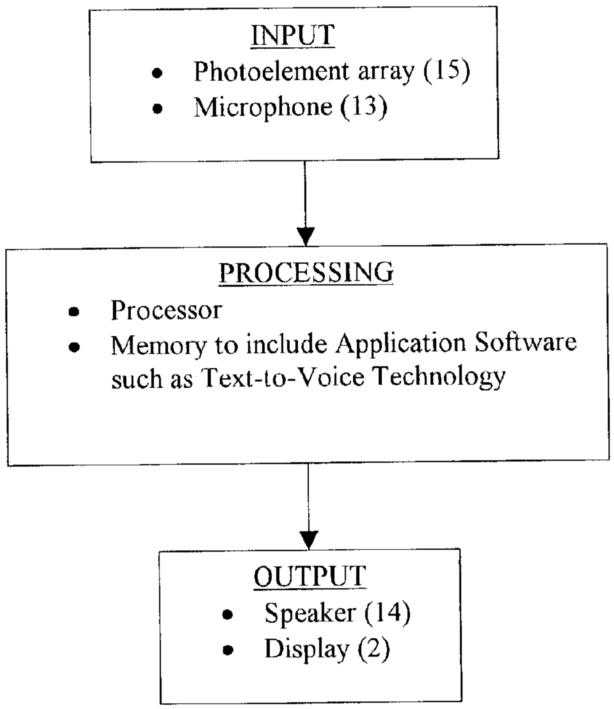
FIG. 2 is a schematic view of the internal hardware and software architecture of the appliance illustrated in FIGS. 1A–1E, which shows the input, processing, and output functions.

FIG. 2 shows two inputs to device 1, with the inputs being the photoelement array 15 for capturing information and the microphone 13 for receiving audible information from the human voice. However, it should be noted that device 1 is not limited to photoelement array 15 input; other inputs in the market that will perform the same function more efficiently and economically can be substituted.

FIG. 2 further shows two outputs for the reading device 1, with these two outputs being the speaker 14 and display 2.

FIG. 2 shows that the processor and memory, to include application software such as text-to-voice technology, are in communication with each other and other components of device 1.

When the user turns device 1 on through power switch 3, the user has the option to press Read button 4, scan information and have the information read back to the user utilizing text-to voice technology either in user's own voice, the voice of user family, or the default voice through a headphone connected to headphone outlet 14. While scanning both capture buttons 12 are depressed, applying more pressure to one than the other will not affect scanning. Both buttons are provided to accommodate different user strengths and preferences. If device 1 loses contact with the paper temporarily while capture buttons 12 are depressed, scanning pauses and will append when contact is made again on paper (this is to make the scanning of large paper such as newspapers easier). If the user wants to display text only on the display panel, the user presses Display button 5 after the power switch 3 is turned on. Text is displayed white on black, the preferred mode of visual impaired persons, one line at a time (Marquee style) thus allowing the user to increase font size from default size of 16 points to either font size of 18 or 20 points. If the user wants to both listen to and display text, after turning device 1 on through power switch 3, the user presses Read button 4 and Display button 5 within seconds of each other to have the information read back to the user through the use of a headphone that is connected to headphone outlet 14. While in the process of reading, to verify the meaning of a word, the user presses Word button to activate the dictionary, and the meaning of the last word read is given.

Information read through the headphone connected to headphone outlet 14, and/or displayed on display 2 is automatically deleted when scanning resumes, thus freeing storage space unless the user specifies information to save. To save previous paragraph read the user presses navigation button 8 twice.

The disclosure set forth is simply an illustration of the invention and is not intended to be limiting. It will be apparent to those skilled in the art that many modifications of the disclosed embodiment can be made without departing from the spirit and substance of the invention. Any modifications should be included within the scope of the invention as set forth in the claims and equivalents thereof.

I claim:

1. A reading device comprising:

a hand-held reading device, wherein the hand-held reading device's functions are done internally without having any external device intervene to capture input printed text information through digital scanning, to reproduce the information via text-to-speech technology, and/or to display information on a flat-panel display;

a memory, wherein the memory saves captured information, wherein the captured information is automatically deleted after being output to the user unless the user indicates that the captured information is to be saved;

a speaker;

a headphone;

a processor communicating with the memory and text-to-speech technology, wherein the processor executes the text-to-speech technology to convert the captured information into a spoken output;

an input device, wherein the input device receives spoken information from a person that is used to train a speech synthesizer in the text-to-speech technology to output speech in that person's voice as an optional alternative to the computer's synthesized voice;

wherein the spoken output is audibly output to the user using either, or both of, the speaker and the headphone, in either the computer's synthesized voice or a person's voice that is used to train the speech synthesizer;

image capture buttons, wherein the image capture buttons are on the device in an arrangement that accommodates any of, any combination of, or all of, right-handed users, left-handed users, users with different strengths and preferences, and adhering to ergonomics;

wherein the captured information is audibly read to the user via text-to-speech technology when a Read button on the device, and at least one of the image capture buttons, are activated;

wherein the captured information is displayed on a flat-panel display when a Display button on the device, and at least one of the image capture buttons, are activated;

wherein the captured information is simultaneously converted into speech and displayed on the flat-panel display when both the Read and Display buttons, and at least one of the image capture buttons, are activated;

wherein the memory contains a program code, which, when executed by the processor, allows an interruption in the image capture process, wherein the image capture process is interrupted when both of the image capture buttons and/or both of the Read button and the Display button, are not sufficiently pressed, where insufficient pressing of a button does not result in the activation of a button, and allows information captured after the image capture process is resumed to be appended to the information captured before the image capture process was interrupted;

a flat-panel display, wherein the captured information is displayed on the flat-panel display using a scrolling marquee style and the displaying of the captured information is synchronized with the spoken output generated by the text-to-speech technology from the same captured information, and wherein the text is displayed with white words on a black background;

where the user is given the ability to magnify the text to a desirable size without having to display an entire page on the flat-panel display;

navigation buttons, wherein one of the navigation buttons is an Up navigation button which, when activated, jumps to the first sentence of the previous paragraph in the captured information, wherein one of the navigation buttons is a Down Navigation button which, when activated, jumps to the first sentence of the next paragraph in the captured information, wherein one of the navigation buttons is a Left navigation button which, when activated, jumps to the previous sentence in the captured information, wherein one of the navigation buttons is a Right navigation button, jumps to the next sentence in the captured information;

a Word button that provides the meaning of the most recent word output to the user using a dictionary component, which contains information about a plurality of different words, on the reading device; and wherein the shortest communicable text describing the button, and a shortest communicable Braille equivalent of the shortest communicable text, are imposed on the Read button, the Display button, and the Word button.

* * * * *